(12) United States Patent
Weidler et al.

(10) Patent No.: US 11,073,921 B2
(45) Date of Patent: Jul. 27, 2021

(54) ELECTRONIC DEVICE FOR GENERATING ANALOGUE STROKES AND FOR DIGITALLY STORING THE ANALOGUE STROKES, AND AN INPUT SYSTEM AND METHOD FOR DIGITIZING ANALOGUE RECORDINGS

(71) Applicant: STAEDTLER MARS GMBH & CO. KG, Nuremberg (DE)

(72) Inventors: Matthias Weidler, Nuremberg (DE); Andreas Freibert, Langensendelbach (DE); Alexander Rampp, Roth (DE); Dirk Peters, Erlangen (DE); Johannes Philipp Grohs, Forchheim (DE)

(73) Assignee: STAEDTLER MARS GMBH & CO. KG, Nuremberg (DE)

( * ) Notice: Subject to any disclaimer, the term of this patent is extended or adjusted under 35 U.S.C. 154(b) by 0 days.

(21) Appl. No.: 16/625,244

(22) PCT Filed: May 8, 2018

(86) PCT No.: PCT/EP2018/061805
§ 371 (c)(1),
(2) Date: Dec. 20, 2019

(87) PCT Pub. No.: WO2018/233920
PCT Pub. Date: Dec. 27, 2018

(65) Prior Publication Data
US 2020/0142509 A1    May 7, 2020

(30) Foreign Application Priority Data
Jun. 22, 2017    (DE) .................... 10 2017 006 740.6

(51) Int. Cl.
*G06F 3/0354*    (2013.01)
*G06F 3/03*    (2006.01)
*G06F 3/0346*    (2013.01)

(52) U.S. Cl.
CPC ........ *G06F 3/03542* (2013.01); *G06F 3/0317* (2013.01); *G06F 3/0346* (2013.01); *G06F 3/03545* (2013.01)

(58) Field of Classification Search
CPC ............... G06F 3/0317; G06F 3/03542; G06F 3/03545; G06F 3/038; G06F 3/0386; G06F 3/0346; G06K 9/222
See application file for complete search history.

(56) References Cited

U.S. PATENT DOCUMENTS

| | | | | |
|---|---|---|---|---|
| 2005/0069204 | A1* | 3/2005 | Khomo | G09B 11/00 382/186 |
| 2013/0321356 | A1* | 12/2013 | Al-Sharif | G06F 3/0317 345/179 |
| 2018/0284433 | A1* | 10/2018 | Hattori | G06K 9/76 |

FOREIGN PATENT DOCUMENTS

| | | |
|---|---|---|
| CN | 104076912 A | 10/2014 |
| DE | 102014106838 A1 | 11/2015 |
| WO | 02058029 A2 | 7/2002 |

OTHER PUBLICATIONS

English Translation of Notification of Transmittal of Translation of the International Preliminary Report on Patentability dated Dec. 24, 2019, 10 Pages.

* cited by examiner

*Primary Examiner* — Christopher E Leiby
(74) *Attorney, Agent, or Firm* — Lucas & Mercanti, LLP; Klaus P. Stoffel

(57) ABSTRACT

An electronic device, more particularly an electronic stylus, for generating analogue strokes, more particularly handwriting, and for digitally storing the analogue strokes, wherein the device includes components of a writing, drawing and/or painting device for creating analogue recordings on a recording medium, more particularly paper, wherein the device also includes electronic components and software for expanding the device into a digital writing and/or input device. The device has at least one localization unit, more particularly a camera, and as a result of the localization unit a localization between the device and a recording medium is (Continued)

created. The device has at least one motion detection unit, as a result of which, the motions of the device and analogue recordings generated therewith are digitally detected on a recording medium. The motion detection unit is designed as a laser tracker.

10 Claims, 2 Drawing Sheets

ELECTRONIC DEVICE FOR GENERATING ANALOGUE STROKES AND FOR DIGITALLY STORING THE ANALOGUE STROKES, AND AN INPUT SYSTEM AND METHOD FOR DIGITIZING ANALOGUE RECORDINGS

The invention relates to an electronic device for generating analog strokes and for digital storage of the analog strokes.

CROSS-REFERENCE TO RELATED APPLICATIONS

The present appication is a 371 of International application PCT/EP2018/061805 filed May 8, 2018, which claims priority of DE 10 2017 006 740.6, filed June 22, 2017, the priority of these applications is hereby claimed and these applications are incorporated herein by reference.

BACKGROUND OF THE INVENTION

Furthermore, the invention relates to an input system and method for processing analog recordings.

Devices, systems and methods for generating analog strokes, and systems and methods for their digitization are known in principle.

Analog recordings are thus created on a paper document and the user stroke motions of the user are detected and recorded with the integrated infrared camera. The recorded data can then be transferred to a computer.

However, it is disadvantageous in this case that the paper base is a so-called doped paper provided with a dot pattern provided in some form.

Regardless of the fact that the recording base is a special paper, the fact that the dot pattern is recognizable and impairs the overall impression of the recording is regarded as disadvantageous.

Furthermore, systems are known for converting analog recordings into digital data, in which a receiver unit is mounted on the edge of the recording document and a transmitter unit is provided on the recording device. The tip of the recording device can be described or located at any time via XY coordinates via this combination of transmitter and receiver.

Although no dosed special paper is needed in the above embodiment, a multi-part transmitter and receiver unit is needed however, wherein at least the receiver unit must be held at a constant distance from the paper before each recording.

Furthermore, systems are known for the simultaneous storage of analog and digital data, the systems including a so-called sensor board, over which a paper sheet is arranged. Analog recordings are created on the paper sheet using an analog writing device, which recordings are able to be simultaneously detected and stored digitally via the sensor board.

It is to be regarded as a disadvantage in this case that a special sensor board must be present and that the paper must also always be fixed, since otherwise the digital recordings do not correspond to the analog templates, overlapping, for example.

As a further disadvantage of some of the known solutions, it is also considered to be disadvantageous that it is sometimes not possible to correctly associate expansions or additions of older analog recordings with the recorded digital data when use is offset in time.

SUMMARY OF THE INVENTION

The object of the invention is therefore to provide an electronic device and an input system which does not have the disadvantages mentioned above and with which it is possible to digitize the analog recordings generated using a conventional writing device on any recording medium.

It is a further object of the invention to provide an input system with which analog recordings are converted into a digital form in order to subsequently process, sort, categorize, to distribute and/or store them in a retrievable manner via search functions.

Furthermore, it is an object of the present invention to provide a method which makes it possible to digitize the analog recordings or handwritten notes or sketches generated using an electronic device as simply as possible on any recording medium.

An electronic device is to be understood below as a writing and/or input device which, on the one hand, includes components of a conventional writing, drawing and/or painting device for creating analog recordings. Conventional writing devices generally have at least one pen ink chamber and/or other inking application medium having a writing or recording tip.

On the other hand, the electronic device additionally has electronic components and software modules that are needed to detect the analog recordings and detect, edit, store and transmit them as digital data.

The device according to the invention relates to an electronic device for generating analog strokes and for digital storage of the analog strokes, wherein the device has components of a writing, drawing and/or painting device for creating analog recordings on a recording medium, wherein the device has electronic components and software for expanding the device into the digital writing and/or input device, wherein the device has at least one localization unit that enables a localization between the device and a recording medium. Furthermore, the device comprises at least one motion detection unit, wherein the motion detection unit digitally detects the motions of the device and thus generated analog recordings on a recording medium and wherein the motion detection unit is designed as a laser tracker, also known as "laser speckle motion tracker".

Electronic components and software comprise at least one IMU, a camera reference system, a microcontroller, a laser tracker and an evaluation software, wherein the electronic components and software are connected or in contact with each other via a circuit board and/or other conductive connections.

The laser tracker is designed as an XY tracker, wherein the XY tracker is a 2D detection unit for detecting the data (X, Y) in a Cartesian coordinate system (X, Y) as a function of time (t).

The laser tracker can also be present as an XYZ tracker, wherein the XYZ tracker is designed as a 3D detection unit for detecting the data (X, Y, Z) in an orthogonal coordinate system (X, Y, Z) as a function of time (t).

The localization unit includes at least one IMU, a camera reference system, a microcontroller and an evaluation software for the absolute localization of the device relative to the recording medium. The localization takes place as the localization of at least three edge lines of the recording medium for the analog recordings.

The evaluation software is/forms a sensor/data fusion unit, wherein the data of the localization unit and the motion detection unit are fused by the sensor/data fusion unit.

The device further comprises, as an electronic component, a distance meter for detecting the distance (h) of the device from a recording medium, wherein the distance (h) is present as a function of time (t). The distance meter is present as a laser-based distance meter.

The device according to the invention has, as further electronic components and/or software, at least one processor, a sensor, a data storage unit, an energy source, a charge control, a mirror element, an on/off switch, a signal generator, a microphone and/or a data transmission unit. The at least one sensor is present as a contact sensor, which is designed as a pressure sensor and/or strain gauge for activating the device in contact with the recording medium.

The data transmission unit is a communication module for transmitting detected and processed data to a digital terminal. Such a unit can be a Bluetooth unit, WLAN coupling or cable connection.

A signal generator optionally integrated in the device can be designed as an acoustic and/or optical signal generator.

Analog recordings can be automatically digitized on recording media using the electronic device according to the invention. It has turned out to be advantageous that the recording medium does not have to be a special medium, such as doped paper, when using the input system. As a recording medium, paper can be in loose or bound form, as a spiral notebook, or as a notepad. A film or other materials can also be used as a recording medium. In this case, it is regarded as advantageous when the recording medium has a rectangular shape and is bounded in a straight line.

The above designated input system includes at least an electronic device, a recording medium and a digital terminal.

Some of the components named above are described below.

Laser trackers are also known under the term mouse tracker, XY tracker, XYZ tracker and/or "laser speckle motion tracker".

XY trackers or XYZ trackers detect the motions of the writing tip on the recording medium in relation to the previous position at a high and temporal resolution. The measurements in this case are based on the change of the laser speckle pattern during motions over a reflecting surface.

The functional principle of the recording motions of the laser tracker corresponds to an optical computer mouse, as known from the prior art. Motions/fine motions are recorded here, for example, when interacting with a computer. Motions in 2D and/or 3D are detected. In addition to the motions, the laser tracker can also detect clicks and/or residence time at specific positions of the recording medium. It has surprisingly turned out that the laser tracker contributes significantly to the solution of the problem.

IMU (inertial measurement unit) is understood to mean a spatial combination of several inertial sensors such as acceleration sensors and gyroscope/yaw rate sensors. IMU constitutes the sensory measuring unit of an inertial navigation system and is used for motion and position detection both in the plane and in space. In general, the IMU is thus used to measure the orientation of a device in space.

In the present application, pressure sensors are used to detect whether the writing tip of the device is located on the recording medium or not. Furthermore, pressing force of the writing tip on the recording medium can be determined using a pressure sensor, for example, in order to detect different line strengths as a function of the pressure and integrate them into the detected data.

In order to enable a method of automatic digitization of analog or handwritten recordings, the analog writing or drawing device is equipped at least with the additional components described above.

In order to ensure the method of digitizing analog recordings, the electronic device includes a software component that detects and processes the data of the sensors and/or electronic components. A so-called embedded software in the microprocessor is responsible for the processing of data.

The scope of the data processing is regulated depending on the design/functional range of the embedded software, that is, it is determined by whether the data are processed on the electronic device itself or directly, or on a digital terminal.

The data supplied by the electronic device can be further processed by means of a software application which is installed on any digital terminals of the user and is used as a digital output and processing medium.

If the electronic device has a display unit, the software application can also be accommodated directly in the device in order to process the data already detected in the electronic device and only then to transmit it to a digital terminal.

The method according to the invention is set out below in the essential 8 process steps.

Process Step 1: Activation of the Electronic Device;

This can be implemented, for example, via an on/off switch in order to supply the electronic components with electrical energy.

Process Step 2: Calibration of the IMU Sensor;

Calibration of the IMU sensor to the camera reference system.

This is done via the absolute localization of the camera/camera reference system. For this purpose, it is necessary that at least two corners, and thus at least three edges or at least edge sections of the recording medium to be provided with analog recordings, are recognizable to the camera. These two corners (and thus three edges) are detected and stored by the camera reference system. This localization/position determination is used to determine the rotation of the sheet as a function of time (t).

At least one camera, IMU, microcontroller and evaluation software are required to execute this process step.

Process Step 3: Stylus on Paper;

The electronic device recognizes the status "stylus on paper".

The status "stylus on paper" can be generated by means of pressure sensor, strain gauges and/or microcontroller.

Process Step 4: Detection of Motions of the Device;

Fine motions of the device or its writing tip are recorded with XY tracker. As soon as the recording medium is localized absolutely, the motions/fine motions of the writing tip relative to the recording medium can be tracked during the analog writing/drawing process via the XY tracker and are engaged, processed and digitally stored as data (x, y) at clocked time intervals (t).

IMU, XY tracker, microcontroller and evaluation software are then activated.

Process Step 5: Absolute Localization of the Stylus Tip Position on/in the Coordinate System of the Recording Medium;

It is necessary that an absolute localization of the stylus tip takes place on the application medium, since the position (X, Y) of the electronic device in the coordinate system of the recording medium must be known.

For this purpose, at least one corner and thus two adjacent edges of the recording medium must be visible to the camera system in order to detect the position (X, Y) of the device/stylus.

For example, the adjacent left sheet edge and the adjacent upper sheet edge must also be detected at the upper left corner of the recording medium.

The system is operational when, on the one hand, the IMU sensor is calibrated and the status "stylus on paper" is detected.

Camera, microcontroller, IMU and evaluation software are required for this purpose.

Process Step 6: Fusion of Sensor Data

The sensor data is fused in a further method step, which makes it possible for the recorded fine motions of the stylus tip to be localized on the recording medium during the analog writing or drawing process with the aid of the data calculated in process step 5. For this method step, it is necessary that both the fine motions of the stylus tip are tracked and recorded correctly on the recording medium by means of XY tracker, and that the absolute localization of the stylus tip was performed on the recording medium.

Process Step 7: Storage of Image Data

The fused sensor data of the fine motions, which were recorded and digitized in the "stylus on paper" status, are stored almost simultaneously by an evaluation software as a time-dependent optically represented data record.

Process step 8: data records are transmitted to any terminal for reconstructing, further processing, rendering and resaving.

In the above inventive method having the individual process steps, it has also turned out to be advantageous if in
- Process step 2, a second camera is used to achieve a reliable continuous (time-dependent) determination of the position of the device to the recording medium. It has turned out to be advantageous when using two cameras that the cameras should be positioned one below the other in such a way that at least one sheet edge can be respectively detected by a camera.
- Process step 2, the motions of the electronic device and the recording medium can be distinguished by the use of a second camera.
- Process step 2, in the IMU to include only data of an acceleration sensor and data of a gyroscope sensor in the sensor data fusion, since the magnetic field sensor of the IMU is exposed to strong external influences such as earth's magnetic field, mobile phones or screens. A more accurate determination of the orientation to the recording medium can thus be ensured in the sensor fusion.
- Process step 4, when the XY tracker and laser are positioned as close as possible to the device's longitudinal axis. This leads to a reduction in the angle between the laser and XY tracker and the stylus axis/stylus tip, by which trouble-free operation with high sharpness and low positional deviation of the data is possible when the writing tip is lifted from the recording medium. It is therefore advantageous when the angle at the stylus tip, spanned by laser and XY tracker, goes to 0.
- Process step 4, a laser-based distance meter for detecting the distance (h) between recording medium and stylus tip is designed for the exact calculation or extrapolation of height-related distortions/inaccuracies, since the tracker data is a function of the distance (h). The detector for distance measurement has a slightly offset axis to the optical axis of the laser and the XY tracker to calculate the distance by means of triangulation.
- Process step 5, the field of view of the camera(s) is designed enlarged. The at least one camera is equipped with wide-angle lenses for this purpose. In addition, it has turned out to be advantageous when the camera is arranged in the rear region of the device, or the distance stylus tip to camera is chosen as large as possible.

Subsequently, the data are transmitted in/by means of a software application (APP) to any digital terminal of the user, reconstructed and displayed or illustrated. The data can optionally be further processed by further software applications on/with the terminal and can be saved as processed data again and modified.

By way of example, the conversion of handwritten recordings by means of optical character recognition (OCR) and/or electronic text recognition (ICR) can be mentioned.

The goal of digitally visualizing the analog recordings on universal recording media on a digital writing and input device and/or on a digital terminal/output medium has been achieved by the above method. For example, the digitized data can be stored via an application software on PC/notebook/tablet/smartphone. Sensor data recorded in the electronic device can be reproduced as digital reconstructions by an output medium in the form of an electronic terminal. In addition, these digital reconstructions of the analog input can be digitally changed and/or further processed by means of the application software on an output device/terminal.

It has surprisingly been found that the presented method enables the user to efficiently store, categorize, use and process information and make search functions accessible.

The inventive method converts these analog inputs simultaneously in a digital form or output form without further aids and process steps for the user.

In addition, the method according to the invention automatically records, processes and displays metadata of the writing, drawing or painting process of the user and displays them in an output medium. For example, metadata can be the location and time point of the analog record, and the individual, personal, and unique movement momentum of writing, drawing, and/or painting. Examples of metadata can be the pressure of the writing tip on the writing pad, the residence time of the writing tip in certain situations, the speed of recording creation and the direction of the writing tip when writing, drawing and/or painting.

The invention will be further explained below with reference to FIGS. 1 and 2.

DETAILED DESCRIPTION OF THE INVENTION

Figure 1:
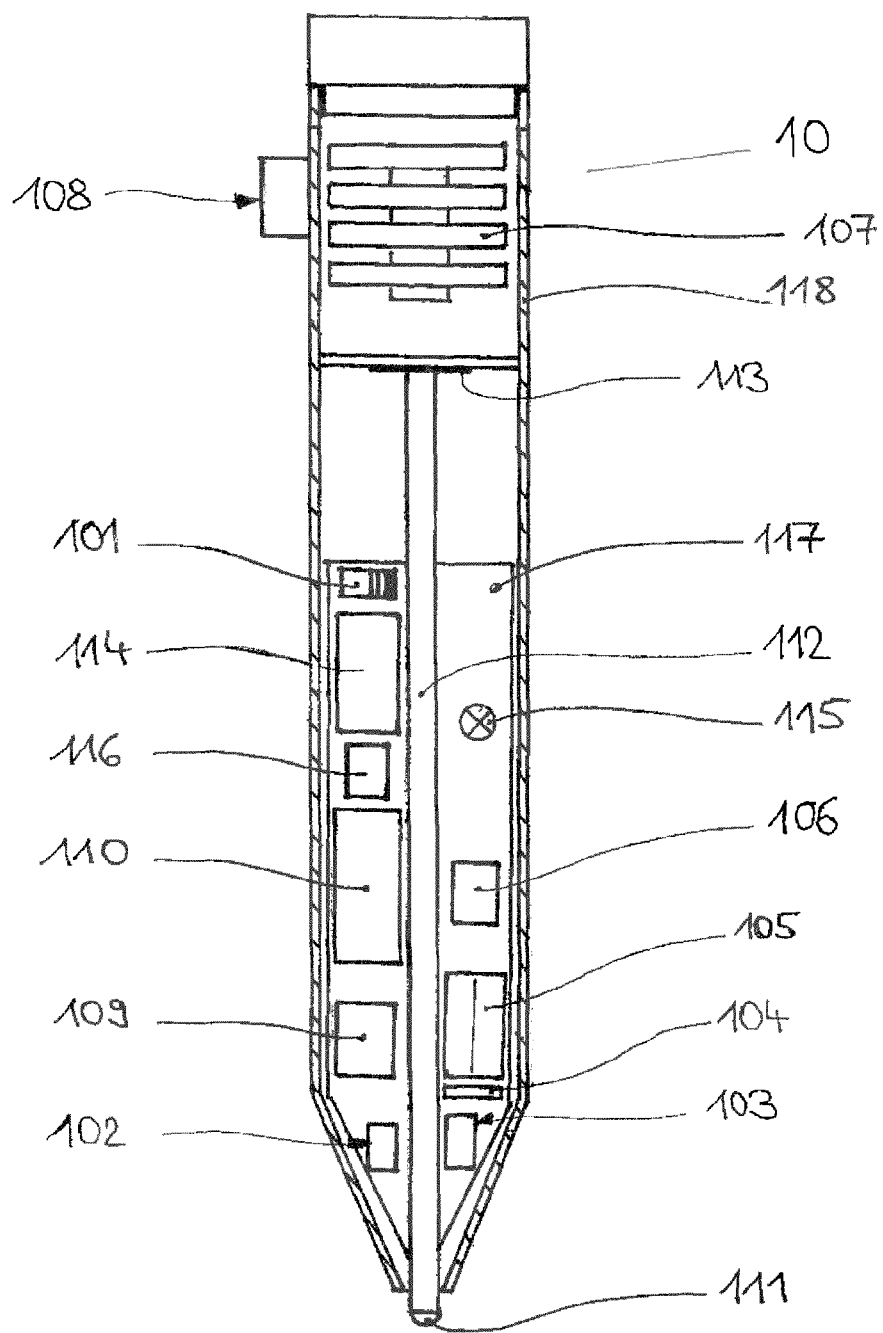
FIG. 1: Section through an input device according to the invention.

FIG. 1 shows an electronic device 10 according to the invention, with which analog or handwritten recordings (202) can be generated. In order to enable a method of automatic digitization of analog or handwritten recordings (202), the analog writing or drawing device is equipped with sensors and further electronic components, so that it also acts as a digital writing and/or input device 10. For this purpose, the device 10 has components or electronic components, such as at least one IMU 102, XY tracker 103, camera 108, pressure sensor 113, microprocessor/controller 110, memory unit 114, energy source 107, data transmission unit 109, acoustic signal device 115, microphone 116, charge control 106 and possibly further components in order to digitize the analog recordings (202). A unit for laser-based distance measurement 105 is further integrated to correct the tracker data, which also represent a function of the distance to the recording medium; in the case where the writing tip 111 loses contact with the recording medium (202), the distance measurement per time unit (t) is automatically activated by the pressure sensor.

A unit necessary for the invention forms the optical unit of the electronic device 10, consisting of XY tracker 103, unit for laser-based distance measurement 105 and mirror element 104.

It has turned out to be particularly advantageous when the XY tracker 103 is designed or fastened close to the tip for detecting motions (X, Y coordinates), since in this way a lack of definition of the angle of the writing device longitudinal axis to the recording medium during writing approaches zero/converges.

It has further been shown that the unit for distance measurement 105 and the XY tracker 103 can use a common laser (105).

A small mirror element 104 is positioned at a fixed angle over the CCD sensor field (charge-coupled device) of XY tracker 103. The laser beam can illuminate the "field of view"/CCD sensor field of the XY tracker via a small opening in the mirror element 104.

The optical axis of the laser and the XY tracker coincide here. A detector for distance measurement has a slightly offset axis in order to be able to measure the distance by means of triangulation and/or, on the other hand, the phase. Not shown and described is the alternative, in which both unit for distance measurement and XY tracker each use their own associated laser. Batteries or rechargeable batteries can be provided as an energy source, the charge state of which can be visualized via a charge indicator light. The above-described components are electrically conductively mounted/contacted with the base plate/circuit board 117 held in the housing 118, or at least connected via other conductive connections such as cables. An on/off switch is integrated to switch off the device in the rest state.

Likewise, a writing medium 112 is held in the housing 118 of the device 10, designed here by way of example as a ballpoint pen ink chamber to generate an analog recording (202) on a recording medium (20) using the writing tip 111.

Figure 2:
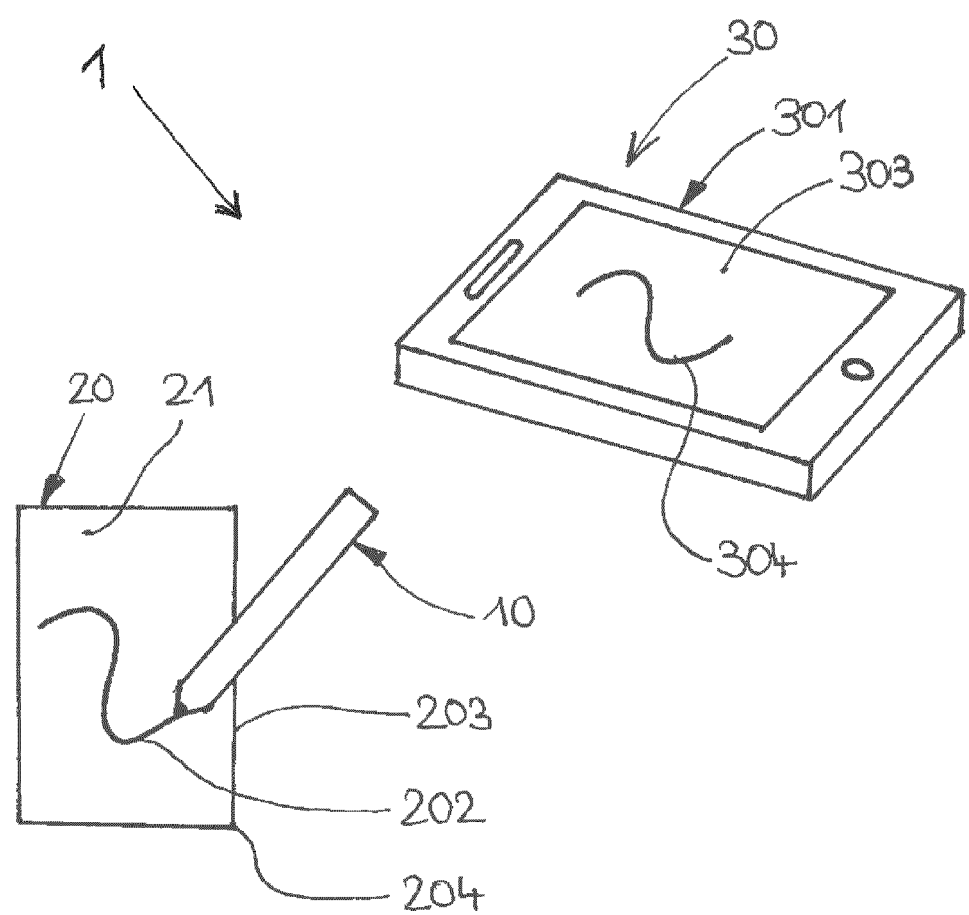
FIG. 2: Input system according to the invention.

FIG. 2 shows an input system 1 which is composed at least of one electronic device 10, one recording medium 20 and one digital terminal 30.

The electronic device 10 is constructed here according to FIG. 1. The digital terminal 30 can be configured by way of example as a tablet 301 or alternatively as a computer having a screen (302). The digital recording 304 is again located on the display 300 or screen 300 of the terminal 30, which recording had been generated in a first step as an analog recording 202 by means of the electronic device 10 on the recording surface 201 of the recording medium 20.

In the illustrated form, the data transfer between electronic device and terminal takes place in wireless form, such as via Bluetooth.

A data transfer via a USB cable connection is also possible in principle. The recording medium 20 is bounded or uniquely defined by the edge 203 and corner 204.

POSITION LIST 1 input system
10 electronic device
101 switch on/off
102 IMU
103 XY tracker
104 mirror element
105 unit for laser-based distance measurement
106 charge control
107 energy source
108 camera
109 data transmission unit
110 microprocessor, controller
111 writing tip
112 writing medium
113 pressure sensor
114 storage unit
115 signal generator
116 microphone
117 base plate/circuit board
118 housing/shaft
20 recording medium
21 recording surface
202 analog recording
203 side edge(s)
204 corner(s)
30 digital terminal
301 tablet
303 display
304 digital record recording

The invention claimed is:

1. An electronic device for generating analog strokes and digital storage of analog strokes, comprising:
    components of a writing, drawing and/or painting device for generating analog recordings on a recording medium having at least two corners and at least three edges;
    electronic components and software for expanding the device into a digital writing and/or input device;
    at least one localization unit that has at least one IMU, a camera reference system, a microcontroller, and an evaluation software for absolute localization of the device relative to the recording medium, wherein the localization unit is configured to provide a localization between the device and a recording medium, wherein the localization is formed as a localization of the at least two corners and the at least three edges of the recording medium for the analog recordings using only the camera reference system without requiring the device to trace, draw or contact the at least two corners and the at least three edges of the recording medium for the analog recordings; and
    at least one motion detection unit configured to digitally detect motions of the device and thus generated analog recordings in a coordinate system of the recording medium,
    wherein the motion detection unit is a laser tracker.

2. The device according to claim 1, wherein the electronic components and software comprise at least one IMU, a camera reference system, a microcontroller, a laser tracker and an evaluation software, wherein the electronic components and software are in contact with each other via a circuit board and/or other conductive connections.

3. The device according to claim 1, wherein the evaluation software is configured as a sensor/data fusion unit, wherein the localization unit and the motion detection unit are brought together by the sensor data fusion unit.

4. The device according to claim 1, wherein one of the electronic components is a distance meter for detecting a distance of the device from the recording medium, wherein the distance is present as a function of time, wherein the distance meter is a laser-based distance measuring device.

5. The device according to claim 1, wherein the electronic components and software include a processor, a sensor, a data storage unit, a power source, a charge control, a mirror element, an on/off switch, a signal generator, a microphone and/or a data transmission unit.

6. The device according to claim 5, wherein the sensor is a contact sensor designed as a pressure sensor and/or strain gauge for activating the device in contact with the recording medium.

7. The device according to claim 5, wherein the data transmission unit is a communication module for transmitting detected and processed data to a digital terminal, wherein the data transmission unit is configured as a Bluetooth unit, a WLAN coupling or a cable connection.

8. The device according to claim 5, wherein the signal generator is an acoustic and/or optical signal generator.

9. An input system, comprising: an electronic device according to claim 1; a recording medium; and a digital terminal.

10. A method for digitizing analog recorded data recorded with an electronic device according to claim 1, for simultaneous detection of analog and digital data, comprising the steps of:
Step 1: activating the electronic device;
Step 2: calibrating an IMU sensor calibrated to a camera reference system by localizing the camera reference system via a detection and storage of at least two corners and at least three edge lines of a recording medium;
Step 3: recognizing by the electronic device a status "device on recording medium" via a contact sensor
Step 4: detecting motions/fine motions in form of analog recordings of the electronic device or a writing tip by a laser tracker in the localized recording medium and storing, processing and/or digitizing the detected motions as data;
Step 5: absolute localizing of a position of the writing tip in the status "device on recording medium" in a coordinate system of the recording medium, via the at least two visible/detectable corners and the three visible/detectable edges of the recording medium for the camera system, for detecting a position of the device;
Step 6: fusing sensor data, to localize the recorded fine motions of the writing tip in the analog writing or drawing process on the recording medium with aid of data calculated in step 5, provided that the fine motions of the writing tip are correctly tracked and recorded on the recording medium using the laser tracker, and also the absolute localization of the writing tip is performed on the recording medium;
Step 7: storing image data, including the fused sensor data of the fine motions, recorded in the status "device on recording medium" and digitized, and simultaneously storing the image data by an evaluation software as a time-dependent optically represented data record; and
Step 8: transmitting data records to any terminal for reconstructing, further processing, rendering and resaving.

* * * * *